(12) United States Patent
Asokan et al.

(10) Patent No.: US 6,456,646 B1
(45) Date of Patent: Sep. 24, 2002

(54) METHODS AND SYSTEMS FOR DETECTING CODEWORDS WITH INTERSYMBOL INTERFERENCE AND IMPERFECT TIMING

(75) Inventors: Ramanathan Asokan, Cary, NC (US); Gregory E. Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/201,573

(22) Filed: Nov. 30, 1998

(51) Int. Cl.[7] .................................................. H04L 27/30
(52) U.S. Cl. ........................ 375/142; 375/150; 375/343; 375/348; 708/5; 708/314; 370/335; 370/342; 370/441
(58) Field of Search ................................. 375/142, 144, 375/148, 150, 343, 348; 708/5, 201, 314, 420, 426; 370/335, 342, 441, 479

(56) References Cited

U.S. PATENT DOCUMENTS

| | | | | |
|---|---|---|---|---|
| 5,297,161 A | * | 3/1994 | Ling | 375/1 |
| 5,465,269 A | * | 11/1995 | Schaffner et al. | 375/200 |
| 5,867,527 A | * | 2/1999 | Ziv et al. | 375/208 |
| 6,295,311 B1 | * | 9/2001 | Sun | 375/147 |

FOREIGN PATENT DOCUMENTS

| | | | |
|---|---|---|---|
| EP | 0880238 A2 | 11/1998 | H04B/1/707 |
| EP | 0945992 A1 | 9/1999 | H04B/1/707 |
| EP | 0895365 A2 | 2/2000 | H04B/1/707 |
| WO | WO96/10873 | 4/1996 | H04B/7/26 |

OTHER PUBLICATIONS

International Search Report, International Application No. PCT/US99/24162.

* cited by examiner

*Primary Examiner*—Stephen Chin
*Assistant Examiner*—Dac V. Ha
(74) *Attorney, Agent, or Firm*—Myers Bigel Sibley & Sajovec

(57) ABSTRACT

Methods and systems are provided whereby correlations between a received signal sample set and a plurality of potential codeword data set are determined and a potential codeword with the highest correlation value is selected as the decoded codeword. The correlation of a potential codeword may be determined by computing a squared magnitude of correlation values between the potential codeword and the received sample set starting at various time points and then summing the squared magnitudes of the correlation values at those points. The number of time points used for correlation computation and summing depends on the time spread of the received symbol pulse. Furthermore, the correlations may be weighted before summing.

53 Claims, 5 Drawing Sheets

METHODS AND SYSTEMS FOR DETECTING CODEWORDS WITH INTERSYMBOL INTERFERENCE AND IMPERFECT TIMING

FIELD OF THE INVENTION

The present invention relates generally to digital communications including wireline, wireless and satellite communications and more particularly to decoding received communication signals.

BACKGROUND OF THE INVENTION

AceS (Asia Cellular Satellite System) SAIS (Satellite Air Interface Specification) specifies two high-power control channels called HBCCH (High Margin Broadcast Control Channel) and HPACH (High Penetration Alerting Channel). These channels use Hadamard codes in addition to the convolutional-coding, CRC (Cyclic-redundant-check) and interleaving, and thus have large coding gain. During initial synchronization, a User-Terminal (UT) needs to receive and decode the HBCCH message to get all the system information. In idle mode, the UT needs to decode the HBCCH message periodically to update the system information. The UT also needs to decode the HPACH message to check for any incoming paging message. Thus, the receiver performance for these channels is important for proper operation of the UT. Very low-rate coding provided by the Hadamard coding and the convolutional coding should help the UT to receive these high power channels even in disadvantaged signal conditions.

In a typical digital communication system (which includes wireline, wireless and satellite communication), a transmitter and a receiver are provided. A transmitter system will typically include a CRC coder for error detection, channel coder for error correction, a modulator and a transmitter. Two levels of channel coding may be used in order to get high coding gain and thus higher link margin. The first level of channel coding, also called outer coding, is typically either a block coding or a convolutional coding. The second level of coding, also called inner coding, may be an orthogonal-code encoding such as Hadamard coding. In an orthogonal code, each codeword is orthogonal to other codewords in the set. As an example, a (128,7) Hadamard code is assumed, but in general any size and type of orthogonal code may be used.

A (128,7) Hadamard coder maps every seven input bits to one of the 128 possible codewords. Each codeword is 128 bits long. Thus, the (128,7) Hadamard codeword set can be represented in a (128×128) matrix form. Hadamard codes have good cross-correlation properties between codewords, but may not have good autocorrelation properties. In order to improve autocorrelation properties, Hadamard codewords are masked by a maximal-length sequence, also called an M-sequence. The output codewords or bits are then modulated and transmitted.

The received symbol response at the detector portion of a receiver is a composite response of transmit filter, channel, and receive filter. The received symbol may be spread over more than a symbol period due to a time dispersive channel, transmit response or the receive filter response. Partial response pulse shaping is an example. The received signal sample at any time is the resultant of the current symbol and the overlapping adjacent symbols. As described herein, the received symbol is assumed to be spread for about 3 symbol periods. Hence, a received signal sample is a sum of three symbols, and thus each symbol experiences inter-symbol-interference (ISI) from two adjacent symbols. In order to detect the symbol with ISI, the receiver typically includes an equalizer.

A conventional receiver system for use with the above transmitter may have a demodulator, a matched filter, a sampler, a symbol-time synchronizer, an equalizer, an orthogonal-code decoder (Hadamard decoder), an outer channel decoder, and a CRC checker. The matched filter in the receiver tries to match the received pulse with its impulse response, and thus maximizes the received signal signal-to-noise ratio (SNR) at the time-point of matching. The SNR maximized point is the optimum point of sampling, and the sampler is supposed to sample the signal at the optimum sampling point. The sampler samples the filtered signal at the symbol rate, i.e., 1 sample/symbol. In order for the sampler to sample at the optimum point, the receiver includes a symbol-time synchronizer. A symbol-time synchronizer tries to synchronize its timing with the received signal symbol time, and thus helps the sampler to adjust its sampling time to the optimum sampling point. Without such a synchronizer, the sampler samples the signal at a random point within a symbol period.

The filtered pulse shape at the output of the matched filter is assumed to be a partial response pulse which is spread over the adjacent symbols. Since the received pulse at the output of matched filter is not Nyquist, the sampled signal will have ISI. If the matched filter output is Nyquist but is not sampled at the zero ISI point by the sampler, then the sampled signal may also have ISI. In order to combat ISI in the sampled signal, the receiver additionally includes an equalizer following the sampler. The synchronized and equalized signal samples are passed to an orthogonal-code decoder (Hadamard decoder).

The orthogonal-code decoder can be a minimum-distance decoder that selects the codeword that has minimum Euclidean distance from the received sample set. The output of the orthogonal-code decoder can be either hard bits or soft values based on the system requirements. The outer channel decoder can be a standard decoder that detects wand/or corrects the errors caused by the channel and the receiver front-end in the received bit sequence.

Without an equalizer and a symbol-time synchronizer, the orthogonal-code decoder would have to detect and decode the codewords from an unsynchronized and unequalized input signal. The performance of the receiver may be affected because with no symbol-time synchronizer, the sampler may not sample the signal at the SNR maximized point (optimum sampling point). Furthermore, the sampled signal may have ISI due to random sampling by the sampler. Also, the received pulse is a partial response pulse that is spread over adjacent symbols, and thus causes ISI in the sampled signal. Thus, the typical receiver includes a symbol-time synchronization circuit and/or an equalizer which increases the complexity of the receiver tremendously.

Systems like ACeS can have different types of burst formats, some with equalizer training sequence and some with no training sequence. The receiver needs to have different type of equalizers to overcome ISI problem for different type bursts. Since most of the channels in ACeS use burst formats with training sequence, the receiver may have an equalizer that uses the training sequence in the burst to equalize the rest of the burst. The channels under discussion (High-power/High-margin channels) use burst format with no training sequence. This requires addition of one more equalizer in the receiver just for the bursts without training sequence, and accordingly increases the complexity of the receiver.

While it may be possible to equalize the signal without a training sequence using a blind equalizer, such an equalizer is very complex, thus causing a tremendous increase in receiver complexity. Therefore, it is preferred that the High-power and High-margin channel bursts in ACeS system are detected without an equalizer. However, the lack of equalizer results in ISI in the input signal samples to the Hadamard code detector that may degrade performance for these channels.

Also, the addition of an equalizer does not completely solve the problem. The sampler without a symbol-time synchronizer still may not sample the signal at the SNR maximized point, and thus including only an equalizer to the receiver will not gain back all the performance loss.

In light of the above discussion, a need exists for a simple receiver which provides performance improvements in the decoding of codewords at the receiver.

SUMMARY OF THE INVENTION

In view of the above discussion, it is an object of the present invention to provide improved performance in orthogonal codeword detection without the need for synchronization of the sampler to the input pulse or symbol.

A further object of the present invention is to reduce the receiver performance degradation due to ISI without the need for an equalizer.

Another object of the present invention is to improve the overall receiver performance without substantially increasing the complexity of the receiver.

These and other objects of the present invention are provided by methods and systems for decoding codewords from a signal received by a receiver without a symbol-time synchronizer and an equalizer.

Correlations between a received signal sample set and a plurality of potential codeword data set are determined and a potential codeword with the highest correlation value is selected as the decoded codeword. The correlation of a potential codeword may be determined by computing a squared magnitude of correlation values between the potential codeword and the received sample set starting at various time points and then summing the squared magnitudes of the correlation values at those points. The number of time points used for correlation computation and summing depends on the time spread of the received symbol pulse.

Thus, in a system which does not have a symbol-time synchronizer which helps the sampler to sample at the optimum point where signal-to-noise level is maximized by a matched filter, and does not have an equalizer which helps to overcome the problem of ISI caused by a partial response pulse, summing the correlations at adjacent time points may decrease the impact of imperfect sampling time and ISI. Thus, the present invention overcomes the problem of ISI and imperfect sampling in unequalized and unsynchronized systems.

In a further embodiment of the present invention, the squared magnitudes of correlation values at each time point may be weighted and the sum determined by summing the weighted squared magnitudes, and the same is repeated for each potential codeword data set. In a particular embodiment, the weights are ½ for the earliest in time correlation value, 1 for the next consecutive correlation value, and ½ for the latest in time correlation value.

In still another embodiment of the present invention, the weights of the squared magnitudes of the correlation values are determined by determining the sampling time offset (τ) for each potential codeword. The sampling time offset for a potential codeword is determined by determining the centroid of the squared magnitude of correlation values at various time points. The weighting factors are then determined for each potential codeword from the determined sampling time offset X and the expected receive symbol pulse shape. Thus, correlation value of a codeword in this particular embodiment is the sum of the weighted squared magnitude of the correlation values at various time points, and the weight factors are as estimated by the determined sampling time offset and the expected receive pulse shape.

In yet another embodiment of the present invention, weights are applied to the correlation values of a codeword at various time points and the squared magnitude of the correlation is computed after summing the correlation values coherently. In this particular embodiment the weight factors are the square root of the weights determined in the previous embodiment. Thus, a correlation value of a codeword in this particular embodiment is the squared magnitude of the sum of the weighted correlation values at various time points, and the weight factors are as estimated by the determined sampling time offset and the expected receive pulse shape.

In still further embodiments of the present invention, the potential codeword with the highest summed squared magnitude of correlation values or squared magnitude of the summed correlations is selected as decoded codeword. Furthermore, the codeword may be a Hadamard codeword.

In yet another embodiment-of the present invention, the received signal is sampled at additional time points than the codeword size to compute the correlation values at different time-offset points spaced by a symbol period. Preferably, the plurality of correlation values comprises three time points.

DETAILED DESCRIPTION OF THE INVENTION

The present invention now will be described more fully hereinafter with reference to the accompanying drawings in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment or an embodiment combining software and hardware aspects.

The present invention utilizes a receiver system which does not have a symbol-time synchronizer or an equalizer. The receiver provides the input to the orthogonal-code decoder, such as a Hadamard decoder, as unequalized and unsynchronized signal samples.

Figure 1:
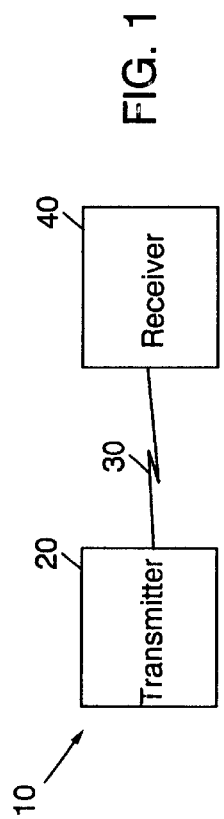
FIG. 1 is a block diagram of a digital communication system.

Referring now to the drawings, the method for detecting orthogonal codewords of the present invention will be described. The codeword detection method of the present invention is used in a digital communication system as shown in FIG. 1. The digital communication system is indicated generally by the numeral 10. The digital communication system 10 includes a transmitting station 20 and a receiving station 40 connected by a communication channel 30. The transmitting station 20 sends data via the communication channel 30 to the receiving station 40. The communication channel 30 may for example be a radio frequency channel such as that used in a mobile communication system.

Figure 2:
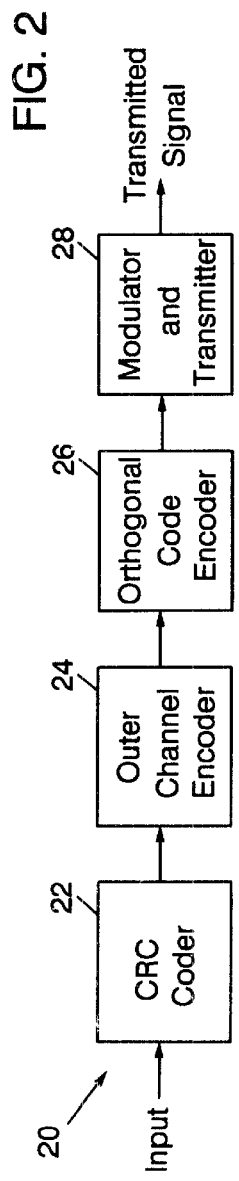
FIG. 2 is a block diagram of a transmitter according to the present invention.

Referring to FIG. 2, the transmitting station 20 typically includes a CRC coder 22, an outer channel encoder 24, an orthogonal-code encoder 26 and a modulator and transmitter 28 according to the present invention. The CRC encoder 22 receives an information bit sequence from an information source and adds a checksum in order for the receiver to detect errors. The outer channel encoder 24 may be a block or convolutional coder that encodes the CRC coded bit sequence to enable error-detection and/or correction at the receiving station 40. The orthogonal-code encoder 26 does the same function as that of encoder 24 but uses an orthogonal codeword set. The output of the encoder 26 is an encoded bit sequence called a codeword. The orthogonal codewords may be masked by a maximal-length sequence (m-sequence) to have good autocorrelation properties. The modulator 28 transforms the coded bits output from the encoder 26 into a form that can be accepted by a communication channel 30. For example, where the communication channel 30 is a RF channel, the modulator 26 converts the transmitted bit sequence into a waveform that can be transmitted over the RF channel. The transmitter portion of the modulator block 28 transmits the modulated bits over the communication channel 30. The orthogonal codeword sequence that is modulated and transmitted is referred to as the transmitted codeword signal.

Figure 3:
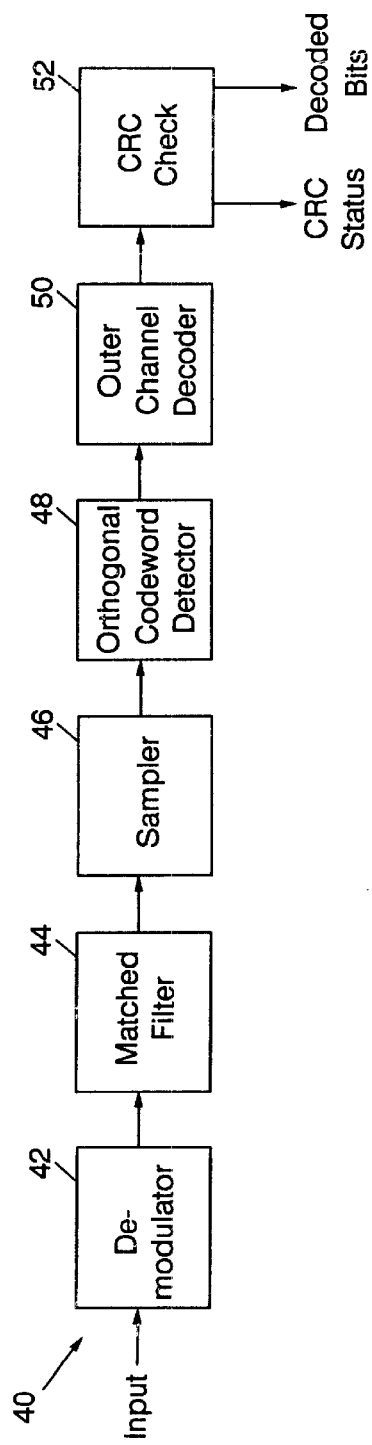
FIG. 3 is a block diagram of a receiver according to the present invention.

FIG. 3 illustrates one embodiment of a receiving station 40 incorporating the present invention. The receiving station 40 is hereafter referred as receiver unit 40. As can be seen in FIG. 3, no equalizer or symbol-timing synchronization circuit is used with receiver unit 40. A receiver such as receiver unit 40 would typically have performance degradation due to ISI by partial response pulse shaping and random sampling of the signal by the sampler. However, utilizing the teaching of the present invention, receiver unit 40 improves on the performance of this less complex receiver model.

The receiver unit 40 incorporating the present invention includes demodulator 42, matched filter 44, sampler 46, orthogonal-code decoder 48, outer channel decoder 50 and CRC checker 52. Demodulator 42 performs the opposite function of the modulator 28, and thus transforms the waveform or other signal received over the communication channel 30 into a signal form that can be used to detect the signal by the rest of the detector portion of the receiver unit 40. The filter 44 filters the demodulated signal before sampling. The filter 44 can be a matched filter that tries to match its impulse response with the received pulse, and thus maximizes the signal-to-noise ratio at the time point of matching. Matched filter 44 may be omitted if sufficient filtering occurs in demodulator 42. The sampler 46 samples the filter output at symbol rate. The receiver unit 40 does not have a symbol-time synchronization circuit, and thus the sampling time is assumed to be uniformly distributed over one symbol-period between burst to burst.

The output of the sampler 46 will have ISI due to a non-Nyquist received pulse and/or imperfect sampling time. The received symbol is assumed to be spread over more than a symbol time due to the composite effect of the transmit filter, channel and receive filter. As an example, the received symbol is assumed to be spread about three symbol-periods, but the present invention extends to any time spread of the received symbols. Thus, the received pulse shape at the output of the sampler 46 in the present example, is three symbol-periods wide and has ISI due to a non-Nyquist pulse shape and imperfect sampling time. Conventional receivers use an equalizer following the sampler to combat the effect of ISI, but receiver unit 40 does not have an equalizer.

Orthogonal-code decoder 48 detects the transmitted codeword sequence from the received signal samples. An optimum decoder detects the codeword by choosing a codeword that has minimum Euclidean distance from the received signal samples. The receiver unit 40 without a synchronizer or equalizer, the orthogonal-code decode would try to detect the transmitted codeword from the unequalized and unsynchronized signal samples, and thus would have performance degradation.

The output of the orthogonal-code decoder 48 is either softvalues or hard-bits of the detected sequence, and is the input to the outer channel decoder 50. The outer channel decoder 50 tries to detect and correct some or all of the errors caused by the channel and the simple receiver.

In order to gain back some of the performance losses from not having an equalizer or synchronizer, the present invention modifies orthogonal-code decoder 48. The orthogonal code can be a Hadamard code, and thus decoder 48 can be a Hadamard-code decoder, but the present invention is not limited to any particular type of orthogonal code.

Knowing the transmit and receive filter impulse responses, it is possible to come up with the resultant impulse response, and use that response with the Hadamard code detector based on minimum distance estimation. However, since the computed impulse response does not include the transmission channel response, it does not solve the problem in a dispersive channel. Furthermore, the receive filter response can vary between receivers within its tolerance which may necessitate designing a receive filter with very tight tolerance. Also, a fast decoder algorithms such as Fast Hadamard decoder (FHT) may be used if the codeword bits are hard-bits but using the transmit pulse and receive pulse responses does not allow use of a FHT because the codeword bits are convolved with the channel response giving soft-values. Thus, the computational complexity gain by FHT may be lost. Also, because the estimated impulse response gives soft-values, either floating or fixed point, instead of the hard-bits, more memory may be required to store these soft-values.

Another drawback of the impulse response based system is that the sampling of the channel impulse response and the sampler at the receiver preferably use the same timing reference. Thus, a timing synchronization circuit typically controls the sampler at the receiver. However, if the receiver does not have a timing synchronizer for a receive partial response signal that is spread over about 3 symbol periods and without the timing synchronizer, the received samples and the sampled channel response may not have the same sampling time reference. This can degrade the overall performance.

The operation of the present invention will now be described with respect to FIGS. 4 through 7 that are block diagram illustrations of operations of various embodiments of orthogonal-code decoder 48 according to the present invention. It will be understood that each block of the block diagram illustrations, and combinations of blocks in the block diagram illustrations, can be implemented by computer program instructions. These program instructions may be provided to a processor to produce a machine, such that the instructions which execute on the processor create means for implementing the functions specified in the block diagram block or blocks.

Accordingly, blocks of the block diagram illustrations support combinations of means for performing the specified functions, combinations of steps for performing the specified functions and program instruction means for performing the specified functions. It will also be understood that each block of the block diagram illustrations, and combinations of blocks in the block diagram illustrations, can be implemented by special purpose hardware-based systems which perform the specified functions or steps, or combinations of special purpose hardware and compute instructions.

The orthogonal-code detector 48 receives from the sampler 46 the sampled values of the filtered input signal. Since the sampler 46 samples the filtered signal at the symbol rate, the number of samples needed by a typical decoder to detect a codeword are N samples, where N is the size of the codeword. As an example, for a (128,7) Hadamard code, a typical decoder needs 128 samples to detect a codeword. In the present invention the orthogonal-code detector 48 receives additional samples adjacent to the required N samples from the sampler 46, and the number of additional samples depends on the spread of the received pulse. In our example for a 3 symbol-period wide receive pulse, the decoder 48 receives 2 additional samples at the adjacent symbol periods. Thus, the orthogonal-code detector 48 receives N+2 samples to detect an orthogonal codeword of N bits long sequence, and a partial response pulse of 3-symbol period wide. Thus, in the present example, three sample data sets may be provided where each sample data set includes 128 samples and where each sample data set is offset in time by one sample. As used herein, the term sample data set refers to a data set of samples corresponding to the number of samples needed to decode the orthogonal codeword. However, the samples may be overlapping between data sets and, therefore, need not be stored as separate data sets.

Figure 4:
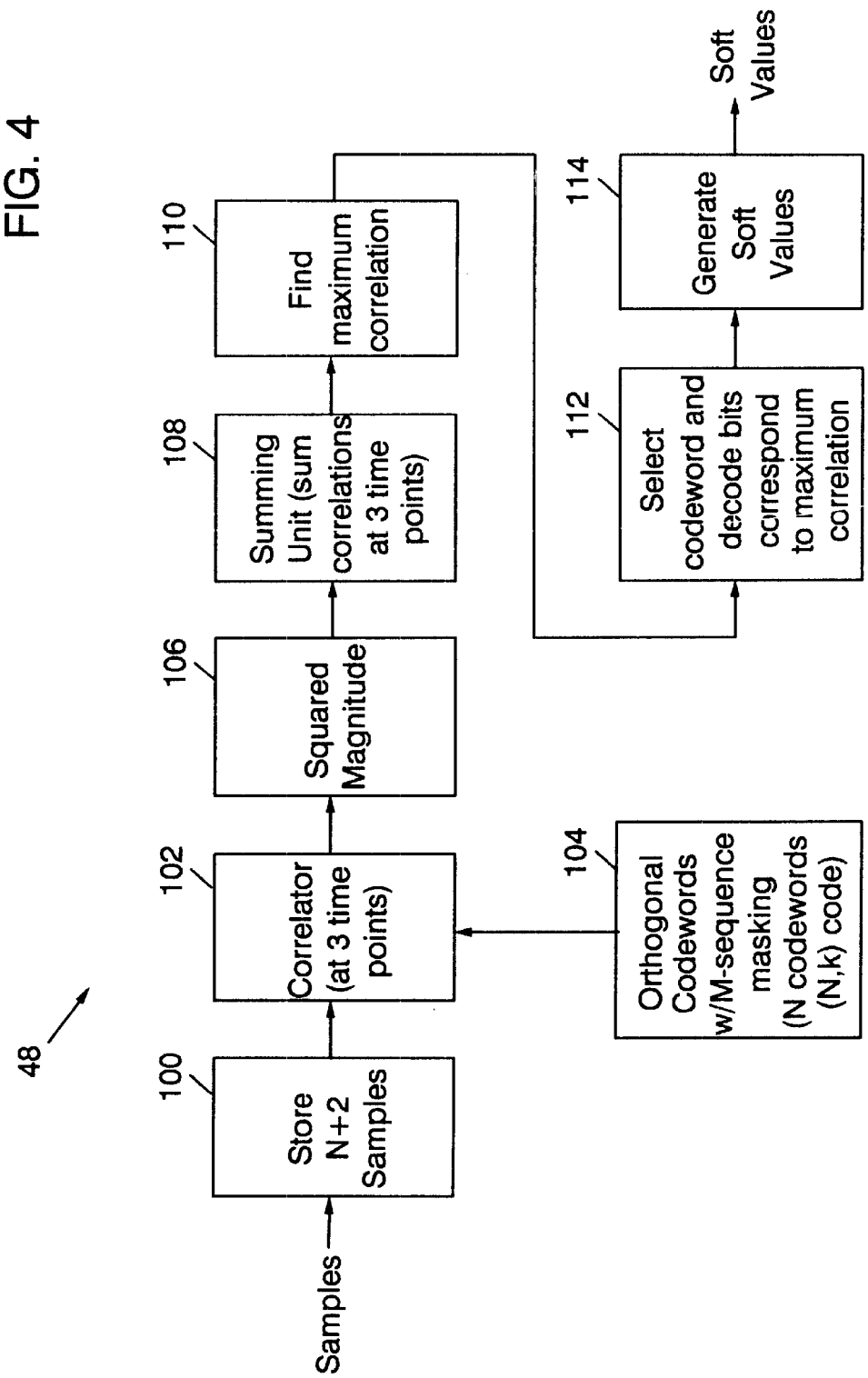
FIG. 4 is a block diagram illustrating operation of one embodiment of a codeword detector according to the present invention.

As seen in FIG. 4, the orthogonal-code detector 48 receives N+2 samples from the sampler 46 and stores them (block 100). After storing N+2 samples, a correlator 102 computes the correlation between the stored samples and each potential codeword set in a stored codeword set such as that illustrated in block 104. The codewords stored in block 104 may be M-sequence masked othogonal codewords as needed by the system for good autocorrelation property. The correlator 102 computes the correlation for each potential codeword at 3 time-offset points of the stored samples. The two additional samples received from the sampler will help the correlator 102 to compute the correlation with each codeword at 3 time offsets. Thus the output of the correlator 102 will have 3 correlation values for each of N codewords, and each correlation corresponds to a different time offset point spaced at a symbol period. Hence there are N*3 correlation values passed by the correlator 102 to a squared-magnitude block 106.

The squared-magnitude block 106 computes the square of the magnitude of each correlation value, and passes them to the summing unit 108. The summing unit 108 sums the square of the magnitude of the correlation values at the 3 time offset points for each codeword. Thus, the output of the summing unit 108 will have N correlation values corresponding to each of the N codewords. The maximum correlation sum is then determined by block 110, and the codeword and encoded bits corresponding to the codeword with maximum correlation sum is selected by block 112 as the decoded bit sequence. Soft values of the decoded bit sequence are then generated in any of the standard forms by soft value generator 114 if needed by the system.

Thus, as one example of this first embodiment of the present invention, consider a (128,7) Hadamard code which has 128 potential codewords and each codeword of 128 bits long is represented as $\{h_{m,n},\ m=0\ \text{to}\ 127, n=0\ \text{to}\ 127\}$. The received pulse is assumed to be three symbol periods wide. The received samples in a burst from sampler 46 may be represented as $\{Y_n, n=0\ \text{to}\ 129\}$. Thus, there are two more samples than the required samples for detection of the codewords. The received samples are then correlated with the Hadamard codewords as follows:

$$R_{YH}(m, k) = \sum_{n=0}^{127} y_{n+k} h^*_{m,n}, m = 0 \text{ to } 127, k = 0, 1, 2$$

where $\{R_{YH}(m,k),\ m=0\ \text{to}\ 127,\ k=0,1,2\}$ is a set of correlation values. Accordingly, there are three correlation values (i.e. for time offsets 0, 1, and 2) for each of the 128 codewords.

The squared magnitude of the correlation values and sum of the correlation values at the three consecutive time offsets are as follows:

$$\vec{P}(m) = \sum_{k=0}^{2} P(m, k), m = 0 \text{ to } 127$$

The maximum correlation value in the set $\{\vec{P}(m)\}$ is then found and the index (m) of the maximum correlation value decides the decoded bits.

The first embodiment of the present invention improves the performance of the receiver despite imperfect sampling by the sampler and the presence of ISI due to a partial response pulse which is spread over more than a symbol period. Thus, in a system which does not have a symbol-timing synchronizer to help the sampler to sample at the optimum point where the signal-to-noise level is maximized, and does not have an equalizer to combat the effect of partial response pulse spread over a few symbol periods, summing the adjacent correlation values should decrease the impact of imperfect sampling time and an unequalized signal.

While the first embodiment of the present invention generally should result in improved performance with a random sampler, in certain instances, such as if the sampler happens to sample the signal at the optimum point this embodiment may not improve and would rather degrade the performance of the receiver. Though the random sampler will have very low probability of sampling exactly at the optimum point, a second embodiment of the present invention is also provided. Accordingly, the second embodiment of the present invention overcomes the problem of the first embodiment of the present invention as well as the original issues of unsynchronized and unequalized signal samples. The second embodiment is illustrated in FIG. 5.

Figure 5:
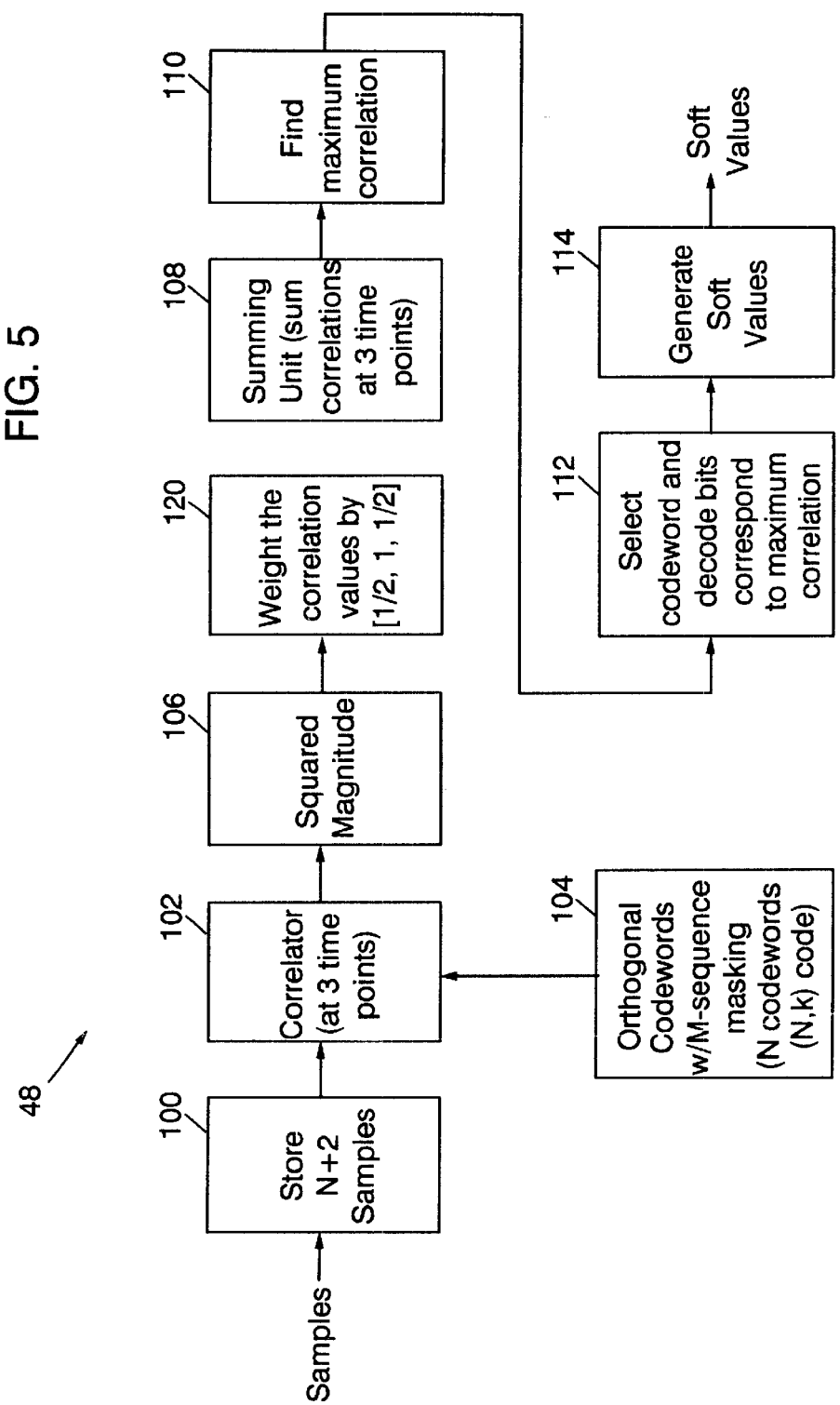
FIG. 5 is a block diagram illustrating operation of a second alternative embodiment of a codeword detector according to the present invention.

As seen in FIG. 5, the second embodiment of the present invention incorporates much of the same operations as the first embodiment illustrated in FIG. 4. Thus, the orthogonal-code detector 48 stores the samples from the sampler (block 100), determines correlation values for each of the potential codeword at three time offset points (blocks 102 and 104), and determines the squared magnitude of the correlation values (block 106) as described above with respect to FIG. 4.

However, unlike the first embodiment, the embodiment of FIG. 5 weights the correlation values (block 120) before summing them at block 108. The weight values correspond to a fixed estimation of the pulse shape and, therefore, the distribution of the pulse across consecutive samples. The weight values are preferably ½, 1 and ½ for a three symbol-period wide partial response pulse, however the actual weight values depend on the squared magnitude of the actual pulse received by the receiver. Here, the first in time sample data set correlation values are weighted by ½, the next in time data set correlation values are weighted by 1 and the last in time data set correlation values are weighted by ½. The weighted values at the three time offset points are then summed for each codeword (block 108). The sums are then used as described above with respect to FIG. 4 as the maximum correlation value is found (block 110), the codeword and corresponding bits are selected (block 112) and the soft values generated (block 114).

As an example of this second embodiment of the present invention for a three symbol period long partial response pulse, the received samples in a burst may be represented as {Yn, n=0 to 129}. Thus, there are two more samples than required for a (128,7) Hadamard code. The received samples are then correlated with the Hadamard codewords as follows:

$$R_{YH}(m,k) = \sum_{n=0}^{127} y_{n+k} h^*_{m,n}, m = 0 \text{ to } 127, k = 0, 1, 2$$

where {$R_{YH}$(m,k), m=0 to 127, k=0,1,2} is a set of correlation values. Accordingly, there are three correlation values (i.e. for time offsets 0, 1, and 2) for each of the 128 codewords.

The squared magnitude of the correlation values, and weighted sum of the correlation values at the three consecutive time offsets are as follows:

$$P(m,k) = |R_{YH}(m,k)|^2, m=0 \text{ to } 127, k=0,1,2$$

$$\vec{P}(m) = \tfrac{1}{2}P(m,0) + P(m,1) + \tfrac{1}{2}P(m,2), m=0 \text{ to } 127$$

The maximum correlation value in the set {$\vec{P}$(m)} is then found and the index (m) of the maximum correlation value decides the decoded bits.

This second embodiment of the present invention has each of the advantages of the first embodiment in improvement of the performance of a system without synchronizing and equalizing the input signal. However, the fixed weighting of the correlation values should help performance when the sampling happened to be at the optimum points.

Figure 6:
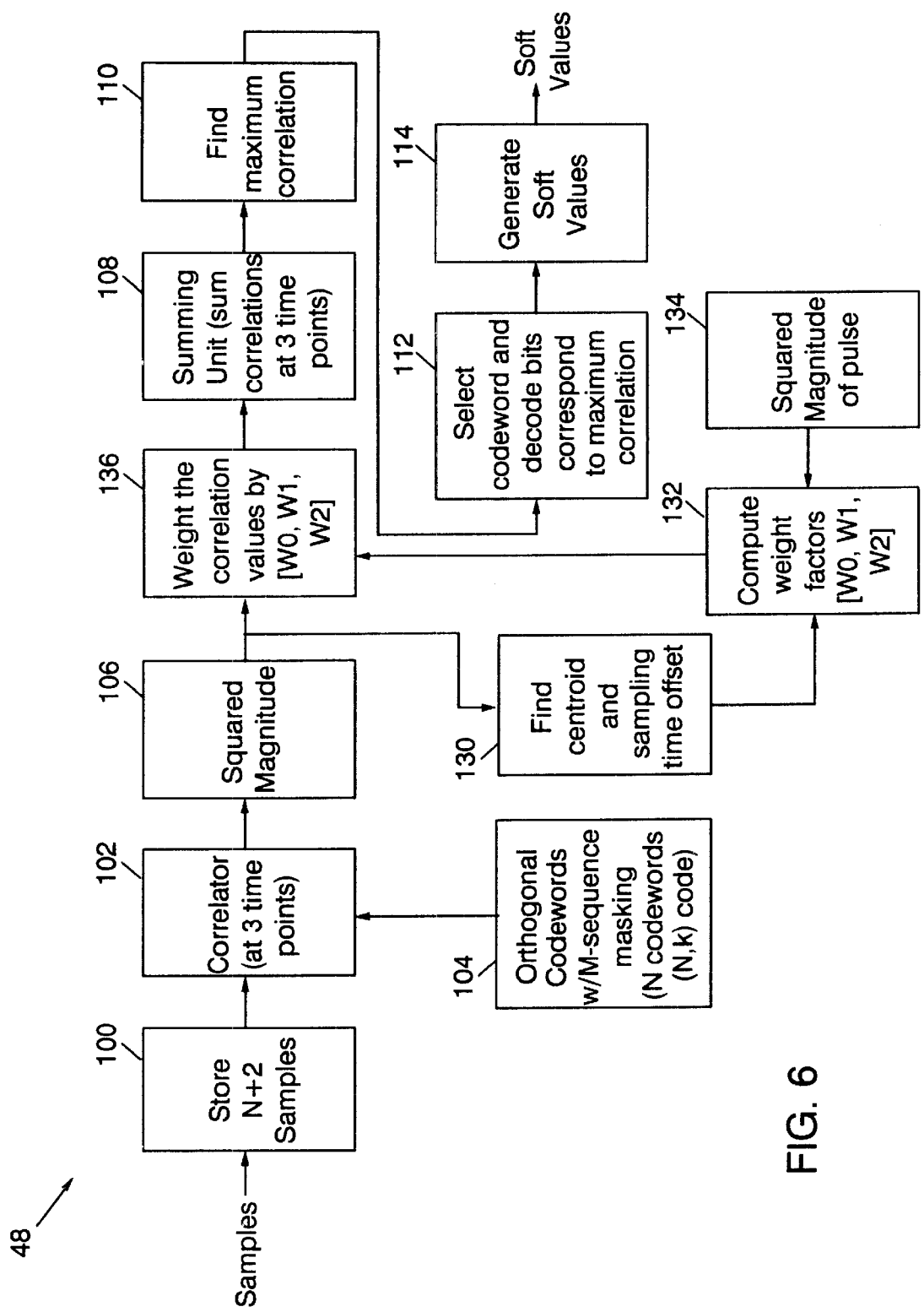
FIG. 6 is a block diagram illustrating operation of a third alternative embodiment of a codeword detector according to the present invention.

A third embodiment of the present invention may provide further improvement in performance without synchronizing and equalizing the input signal to remove ISI. As seen in FIG. 6, the third embodiment decides the weight factors of the correlation values based on the sampling time. The third embodiment computes the sampling time offset from the best sampling point, and computes the weighting factors knowing the approximate pulse shape. The sampling time offset is computed by finding the centroid (mean position) of the correlation values at different time offset points. The squared magnitude of the pulse may be assumed to be triangular in shape over three symbol-time or the actual pulse shape can be used by, for example, using a look-up table.

As seen in FIG. 6, the third embodiment of the present invention incorporates much of the same operations as the first embodiment illustrated in FIG. 4. Thus, the codeword detector 48 stores the samples from the sampler 46 (block 100), determines correlation values for each of the potential codeword at three time offset points (blocks 102 and 104), and determines the squared magnitude of the determined correlations (block 106) as described above with respect to FIG. 4.

However, unlike the first embodiment and the second embodiment, the embodiment of FIG. 6 first determines the centroid of the correlation sample values and the sampling time offset from the optimum sampling point for each codeword (block 130). Weight values are then determined (block 132) based on the expected receive pulse shape stored in block 134 and the sampling time offset from block 130. The squared magnitude of the correlation values for each codeword are then weighted using the determined weighting values (block 136). The weight values correspond to a variable or fixed estimation of the receive pulse shape and a determination of the sampling time offset. The weighted squared magnitude of the correlation values at different time offsets are then summed for each codeword (block 108). The sums are then used as described above with respect to FIG. 4 as the maximum correlation value is found (block 110), the codeword and corresponding bits are selected (block 112) and the soft values generated (block 114).

As an example of this third embodiment of the present invention where there are 128 potential Hadamard codeword data set {$h_{m,n}$, m=0 to 127, n=0 to 127} and three symbol period wide partial response pulse, the received samples in a burst may be represented as {Yn, n=0 to 129}. Thus, there are two more samples than required for the 128 bits long codewords. The received samples are then correlated with the Hadamard codewords as follows:

$$R_{YH}(m,k) = \sum_{n=0}^{127} y_{n+k} h^*_{m,n}, m = 0 \text{ to } 127, k = 0, 1, 2$$

where {$R_{YH}$(m,k), m=0 to 127, k=0,1,2} is a set of correlation values. Accordingly, there are three correlation values (i.e. for time offsets 0, 1, and 2) for each of the 128 codewords.

In the present example, it may be assumed that the squared magnitude of the received pulse has a triangular shape over three symbol-periods as described above, and is also the shape of the squared magnitude of the correlation values of the correct codeword. A perfectly sampled signal will have samples at time-points 0.5, 1.5 and 2.5 over three symbols, and anything other than this is due to imperfect sampling time. The timing offset is the difference between the sampled point and the expected optimum sampling point, and can be anywhere between ±½ a symbol period. Let τ be the sampling time offset. Given the time offset and the pulse shape, it is possible to find the amplitude of the pulse at the sampled points. For this triangular shape, the amplitudes of the pulse at three sampling points spaced at symbol-period will be $$w0 = \frac{0.5T - \tau T}{1.5T} = \frac{0.5 - \tau}{1.5}$$

$$w1 = \frac{1.5T - |\tau|T}{1.5T} = \frac{1.5 - |\tau|}{1.5}$$

$$w2 = \frac{0.5T + \tau T}{1.5T} = \frac{0.5 + \tau}{1.5}$$

where T is the symbol period. These amplitudes at these sampling points will be used as the weighting factor for the correlation summing.

The squared magnitudes of the correlation values are as follows:

$$P(m,k)=|R_{YH}(m,k)|^2, m=0 \text{ to } 127, k=0,1,2$$

The centroid (mean position) and sampling time offset for each codeword correlation values at three consecutive time points may be determined by:

$$\text{mean\_position}(m) = \frac{\sum_{k=0}^{2} kP(m,k)}{\sum_{k=0}^{2} (m,k)}, m = 0 \text{ to } 127$$

$$\tau(m)=\text{mean\_position}(m)-\text{round}(\text{mean\_position}(m)), m=0 \text{ to } 127$$

where $\tau(m)$ is the sampling time offset for the $M^{th}$ codeword and is within ±½, and round ( ) is a function that round a number to its nearest integer.

The weight factors for codeword m may then be determined from the sampling time offset $\tau(m)$ and the receive pulse shape. Assuming the squared magnitude of the receive pulse is triangular shape over 3 symbol-period, then the following weight factors result:

$$w0_m = \frac{0.5T - \tau(m)T}{1.5T} = \frac{0.5 - \tau(m)}{1.5}$$

$$w1_m = \frac{1.5T - |\tau(m)|T}{1.5T} = \frac{1.5 - |\tau(m)|}{1.5}$$

$$w2_m = \frac{0.5T + \tau(m)T}{1.5T} = \frac{0.5 + \tau(m)}{1.5}$$

where $w0_m$ is the weight factor for first in time correlation value, $w1_m$ is the weight factor for next in time correlation value, and $w2_m$ is for last in time correlation value correspond to $m^{th}$ codeword.

The correlation values of a $m^{th}$ codeword are then summed using these weight factors which results in:

$$\vec{P}(m)=w0_m P(m,0)+w0_m P(m,1)+w2_m P(m,2), m=0 \text{ to } 127$$

The maximum correlation value in the set $\{\vec{P}(m)\}$ is then found and the index m of the maximum correlation value decides the decoded bits, thus 7 bits of decoded bits for this example.

Figure 7:
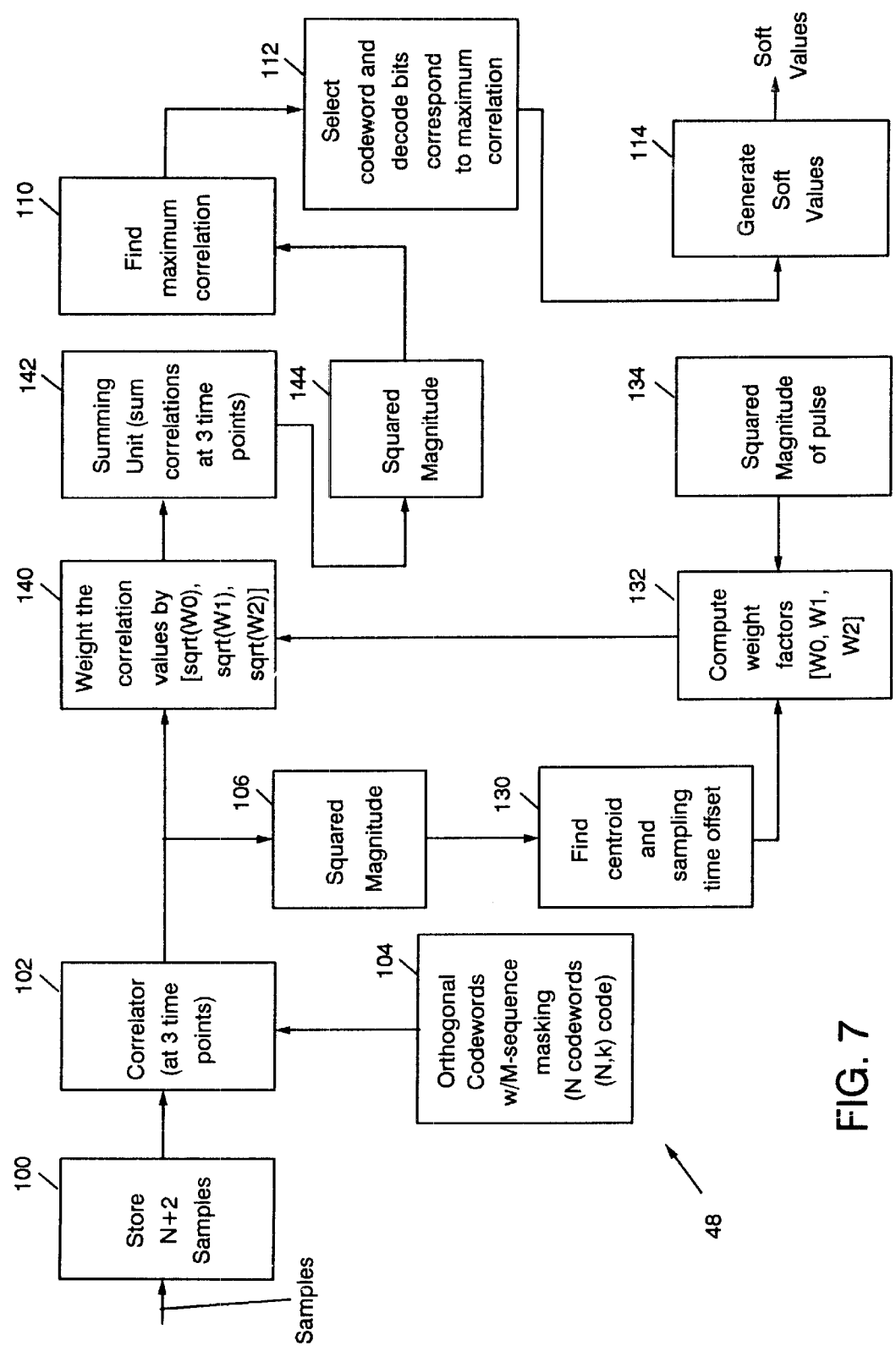
FIG. 7 is a block diagram illustrating operation of a fourth alternative embodiment of a codeword detector according to the present invention.

Because the third embodiment selects the weighting factor based on the computed sampling time-offset, this embodiment is expected to give improved performance with random sampling over one symbol period. A fourth embodiment of the present invention may provide further improvement in performance without synchronizing and equalizing the input signal to remove ISI. As seen in FIG. 7, this fourth embodiment also computes the sampling time offset by finding the centroid (mean position) of the correlation values, and decides the weight factors of the correlation values based on the estimated sampling time offset as described for third embodiment with respect to FIG. 6. However, the square roots of the estimated weight factors are applied to the correlation values of a codeword rather than the squared magnitude of the correlation values. The weighted correlation values of a codeword are summed, and then the square of magnitude of the sum is computed. In this embodiment of the present invention, since the actual correlation values of a codeword are summed, which gives a coherent combining of the samples, rather than its squared magnitude values, and thus it is expected to give better performance.

As seen in FIG. 7, this fourth embodiment of the present invention incorporates much of the same operations as the third embodiment illustrated in FIG. 6. Thus the codeword detector 48 stores the samples from the sampler 46 (block 100), determines correlation values for each of the potential codeword at three time offset points (blocks 102 and 104), determines the squared magnitude of the determined correlations (block 106), determines the centroid and the sampling time offset values for each of the codeword correlation values (block 130), and determines the weight factors for each of the codewords (block 132) as described above with FIG. 6.

However, unlike the third embodiment, the embodiment of FIG. 7 applies the square root of the estimated weight factors to the correlation values for each codeword from block 102 (block 140). The weighted correlation values at each time points are then summed for each codeword (block 142). The squared magnitude of the weighted sum of the correlation values for each codeword is then computed in block 144. The squared magnitude of weighted sums are then used as described with respect to FIG. 6 as the maximum correlation value is found (block 110), the codeword and the corresponding bits are selected (block 112) and the softvalues generated (block 114).

As an example of this fourth embodiment of the present invention where there are 128 potential Hadamard codeword data set $\{h_{m,n}, m=0 \text{ to } 127, n=0 \text{ to } 127\}$ and three symbol period wide partial response pulse, the received samples in a burst may be represented as $\{Yn, n=0 \text{ to } 129\}$. Thus, there are two more samples than required for the 128 bits long codewords. The received samples are then correlated with the Hadamard codewords as follows:

$$R_{YH}(m,k) = \sum_{n=0}^{127} y_{n+k} h^*_{m,n}, \quad m = 0 \text{ to } 127, \quad k = 0, 1, 2$$

where $\{R_{YH}(m,k), m=0 \text{ to } 127, k=0,1,2\}$ is a set of correlation values. Accordingly, there are three correlation values (i.e. for time offsets 0, 1, and 2) for each of the 128 codewords.

The squared magnitudes of the correlation values are as follows:

$$P(m,k)=|R_{YH}(m,k)|^2, m=0 \text{ to } 127, k=0,1,2$$

The centroid (mean position) and sampling time offset for each codeword correlation values at three consecutive time points may be determined by:

$$\text{mean\_position}(m) = \frac{\sum_{k=0}^{2} kP(m,k)}{\sum_{k=0}^{2} P(m,k)}, \quad m = 0 \text{ to } 127$$

$\tau(m) = \text{mean\_position}(m) - \text{round}(\text{mean\_position}(m))$, $m=0$ to 127 where $\tau(m)$ is the sampling time offset for the $m^{th}$ codeword and within $\pm\frac{1}{2}$, and round ( ) is a function that round a number to its nearest integer.

The weight factors for codeword m may then be determined from the sampling time offset $\tau(m)$ and the receive pulse shape. Assuming the squared magnitude of the receive pulse is triangular shape over 3 symbol-period, then the following weight factors result:

$$w0_m = \frac{0.5T - \tau(m)T}{1.5T} = \frac{0.5 - \tau(m)}{1.5}$$

$$w1_m = \frac{1.5T - |\tau(m)|T}{1.5T} = \frac{1.5 - |\tau(m)|}{1.5}$$

$$w2_m = \frac{0.5T + \tau(m)T}{1.5T} = \frac{0.5 + \tau(m)}{1.5}$$

where $w0_m$ is the weight factor for first in time correlation value, $w1_m$ is the weight factor for next in time correlation value, and $w2^m$ is for last in time correlation value correspond to $m^{th}$ codeword.

The correlation values of a $m^{th}$ codeword are then summed coherently using square root of the determined weight factors, and then the squared magnitude of the correlation sum is determined which results in:

$\vec{R}_{YH}(m) = \sqrt{w0_m}R_{YH}(m,0) + \sqrt{w1_m}R_{YH}(m,1) + \sqrt{w2_m}R_{YH}(m,2)$, $m=0$ to 127

$\vec{P}(m) = |R_{YH(m)}|^2$, $m=0$ to 127

The maximum correlation value in the set $\{\vec{P}(m)\}$ is then found and the index m of the maximum correlation value decides the decoded bits, thus 7 bits of decoded bits for this example.

As is clear from the above discussion, while the present invention has been described in examples based on particular assumption, the present invention should not be limited to any particular assumptions. For example, the present invention should not be limited to triangular pulse shapes or symbols spread over three symbol periods. Furthermore, while the present invention has been described with respect to Hadamard codes, as will be appreciated by those of skill in the art, other codewords may be utilized with the present invention. These codewords need not orthogonal. The present invention should also not be limited to use in radiotelephone but may be used in digital communication devices, such as a Personal Information Manager (PIM).

In the drawing and specification, there have been disclosed typical preferred embodiments of the invention and, although specific terms are employed, they are used in a generic and descriptive sense only and not for purpose of limitation, the scope of the invention being set forth in the following claims.

That which is claimed is:

1. A method of decoding codewords from a signal received by a device, the method comprising:
    providing a plurality of signal samples so as to provide a plurality of signal sample data sets that are separated in time by at least one sample period and have a fixed timing relationship to one another;
    determining correlations between a plurality of potential codewords and the plurality of signal sample data sets;
    combining the correlations to provide a plurality of combined values; and
    selecting a potential codeword corresponding to a high combined value as the decoded codeword.

2. A method according to claim 1, wherein said step of combining comprises the steps of:
    computing a squared magnitude of correlation values for each potential codeword for each signal sample data set; and
    summing the squared magnitudes for each signal sample data set corresponding to a potential codeword for each potential codeword.

3. A method according to claim 2, wherein said step of selecting a potential codeword comprises the step of selecting the potential codeword with the highest summed squared magnitude.

4. A method according to claim 3, wherein the codeword is an orthogonal codeword.

5. A method according to claim 3, wherein said step of providing a plurality of signal samples comprises sampling the received signal to provide a plurality of signal sample data sets which are consecutive and separated in time by one sample period.

6. A method according to claim 5, wherein the plurality of signal sample data sets comprises three signal sample data sets.

7. A method according to claim 2, wherein said step of combining the correlations further comprises the step of weighting the squared magnitudes; and wherein said summing step comprises:
    summing the weighted squared magnitudes for each signal sample data set corresponding to a potential codeword for each potential codeword.

8. A method according to claim 7, wherein said step of selecting a potential codeword comprises the step of selecting the potential codeword with the highest summed weighted squared magnitude.

9. A method according to claim 8, wherein the codeword is an orthogonal codeword.

10. A method according to claim 8, wherein said step of providing a plurality of signal samples comprises providing a plurality of signal samples so as to provide a plurality of signal sample data sets which are consecutive and separated in time by one sample period.

11. A method according to claim 10, wherein the plurality of signal sample data sets comprises three signal sample data sets.

12. A method according to claim 1, wherein said step of combining the correlations further comprises the steps of:
    weighting the correlation values; and
    summing the weighted correlation values for each signal sample data set corresponding to a potential codeword for each potential codeword.

13. A method of decoding codewords from a signal received by a device, the method comprising:
    providing a plurality of signal samples so as to provide a plurality of signal sample data sets;
    computing a squared magnitude of correlation values for each potential codeword for each signal sample data set;
    summing the squared magnitudes for each signal sample data set corresponding to a potential codeword for each potential codeword weighting the squared magnitudes;
summing the weighted squared magnitudes for each signal sample data set corresponding to a potential codeword for each potential codeword to provide a plurality of combined values;
selecting a potential codeword corresponding to a high combined value as the decoded codeword; and
wherein the weights are ½ for an earliest in time squared magnitude, 1 for a next consecutive squared magnitude and ½ for a latest in time squared magnitude.

14. A method of decoding codewords from a signal received by a device, the method comprising:
providing a plurality of signal samples so as to provide a plurality of signal sample data sets;
computing a squared magnitude of correlation values for each potential codeword for each signal sample data set;
summing the squared magnitudes for each signal sample data set corresponding to a potential codeword for each potential codeword
weighting the squared magnitudes;
summing the weighted squared magnitudes for each signal sample data set corresponding to a potential codeword for each potential codeword to provide a plurality of combined values;
selecting a potential codeword corresponding to a high combined value as the decoded codeword;
wherein said step of weighting the squared magnitudes comprises the steps of:
determining a centroid from squared magnitudes for each potential codeword;
determining a sampling time offset for each codeword from the corresponding centroid; and
determining weighting factors for each potential codeword from the sampling time offset and a pulse shape.

15. A method according to claim 14, wherein said step of selecting a potential codeword comprises the step of selecting the potential codeword with the highest summed weighted squared magnitude.

16. A method according to claim 15, wherein the codeword is a orthogonal codeword.

17. A method according to claim 15, wherein said step of providing a plurality of signal samples comprises providing a plurality of signal samples of the received signal so as to provide a plurality of signal sample data sets which are consecutive and separated in time by one sample period.

18. A method according to claim 17, wherein the plurality of signal sample data sets comprises three signal sample data sets.

19. A method according to claim 18, wherein the weights are determined by the following equations:

$$w0 = \frac{0.5 - \tau(m)}{1.5}$$

$$w1 = \frac{1.5 - |\tau(m)|}{1.5}$$

$$w2 = \frac{0.5 + \tau(m)}{1.5}$$

where w0 corresponds to the earliest in time signal sample data set, w1 corresponds to the next consecutive signal sample data set and w2 corresponds to the latest in time signal sample data set.

20. A method of decoding codewords from a signal received by a device, the method comprising:
providing a plurality of signal samples so as to provide a plurality of signal sample data sets;
determining correlations between a plurality of potential codewords and the plurality of signal sample data sets;
combining the correlations to provide a plurality of combined values; and
selecting a potential codeword corresponding to a high combined value as the decoded codeword;
wherein said step of combining the correlations further comprises the steps of:
weighting the correlation values;
summing the weighted correlation values for each signal sample data set corresponding to a potential codeword for each potential codeword;
wherein the step of weighting the correlation values comprises the steps of:
determining a centroid from correlation values for each potential codeword;
determining a sampling time offset for each codeword from the corresponding centroid; and
determining weighting factors for each potential codeword from the sampling time offset and a pulse shape.

21. A method according to claim 20, wherein said step of combining the correlations further comprises the steps of:
determining the square root of the weighting factors;
weighting the correlations for each signal sample data set; and
wherein said summing step comprises:
summing the weighted correlation values for each signal sample data set corresponding to a potential codeword for each potential codeword; and
computing a squared magnitude of summed weighted correlations for each potential codeword.

22. A method according to claim 21, wherein said step of selecting a potential codeword comprises the step of selecting the potential codeword with the highest squared magnitude of summed weighted correlation values.

23. A method according to claim 22, wherein the codeword is an orthogonal codeword.

24. A method according to claim 22, wherein said step of providing a plurality of signal samples comprises providing a plurality of signal samples so as to provide a plurality of signal sample data sets which are consecutive and separated in time by one sample period.

25. A method according to claim 24, wherein the plurality of signal sample data sets comprises three signal sample data sets.

26. A method according to claim 25, wherein the weights are determined by the following equations:

$$w0 = \frac{0.5 - \tau(m)}{1.5}$$

$$w1 = \frac{1.5 - |\tau(m)|}{1.5}$$

$$w2 = \frac{0.5 + \tau(m)}{1.5}$$

where w0 corresponds to the earliest in time signal sample data set, w1 corresponds to the next consecutive signal sample data set and w2 corresponds to the latest in time signal sample data set.

27. A system for decoding codewords from a signal received by a device, comprising:
means providing signal samples of the received signal so as to provide a plurality of signal sample data sets that are separated in time by at least one sample period and have a fixed timing relationship to one another;

means for determining correlations between a plurality of potential codewords and the plurality of signal sample data sets;

means for combining correlations to provide a plurality of combined values; and means for selecting a potential codeword corresponding to a high combined value as the decoded codeword.

28. A system according to claim 27, wherein said means for combining the correlations comprises:

means for computing a squared magnitude of correlation values for each potential codeword for each signal sample data set; and means for summing the squared magnitudes for each signal sample data set corresponding to a potential codeword for each potential codeword.

29. A system according to claim 28, wherein said means for selecting a potential codeword comprises means for selecting the potential codeword with the highest summed squared magnitude.

30. A system according to claim 29, wherein the codeword is an orthogonal codeword.

31. A system according to claim 29, wherein said means for providing signal samples comprises means for providing signal samples of the received signal so as to provide a plurality of signal sample data sets which are consecutive and separated in time by one sample period.

32. A system according to claim 31, wherein the plurality of signal sample data sets comprises three codeword data sets.

33. A system according to claim 28, wherein said means for combining the correlations further comprises means for weighting the squared magnitudes; and wherein said means for summing comprises:

means for summing the weighted squared magnitudes for each signal sample data set corresponding to a potential codeword for each potential codeword.

34. A system according to claim 33, wherein said means for selecting a potential codeword comprises means for selecting the potential codeword with the highest summed weighted squared magnitude.

35. A system according to claim 33, wherein the codeword is an orthogonal codeword.

36. A system according to claim 33, wherein said means for providing signal samples comprises means for providing signal samples of the received signal so as to provide a plurality of signal sample data sets which are consecutive and separated in time by one sample period.

37. A system according to claim 36, wherein the plurality of signal sample data sets comprises there codeword data sets.

38. A system according to claim 27, wherein said means for combining the correlations further comprises:

means for weighting the correlation values; and means for summing the weighted correlation values for each signal sample data set corresponding to a potential codeword for each potential codeword.

39. A system for decoding codewords from a signal received by a device, comprising:

means providing signal samples of the received signal so as to provide a plurality of signal sample data sets;

means for determining correlations between a plurality of potential codewords and the plurality of signal sample data sets;

means for computing a squared magnitude of correlation values for each potential codeword for each signal sample data set;

means for weighting the squared magnitudes means for summing the weighted squared magnitudes for each signal sample data set corresponding to a potential codeword for each potential codeword to provide a plurality of combined values;

means for selecting a potential codeword corresponding to a high combined value as the decoded codeword; and wherein the weights are ½ for an earliest in time squared magnitude, 1 for a next consecutive squared magnitude and ½ for a latest in time squared magnitude.

40. A system for decoding codewords from a signal received by a device, comprising:

means providing signal samples of the received signal so as to provide a plurality of signal sample data sets;

means for determining correlations between a plurality of potential codewords and the plurality of signal sample data sets;

means for computing a squared magnitude of correlation values for each potential codeword for each signal sample data set;

means for weighting the squared magnitudes;

means for summing the weighted squared magnitudes for each signal sample data set corresponding to a potential codeword for each potential codeword to provide a plurality of combined values;

means for selecting a potential codeword corresponding to a high combined value as the decoded codeword;

wherein said means for weighting the squared magnitudes comprises:

means for determining a centroid from squared magnitudes for each potential codeword;

means for determining a sampling time offset for each codeword from the corresponding centroid; and means for determining weighting factors for each potential codeword from the sampling time offset and a pulse shape.

41. A system according to claim 40, wherein said means for selecting a potential codeword comprises means for selecting the potential codeword with the highest summed weighted squared magnitude.

42. A system according to claim 41, wherein the codeword is a orthogonal codeword.

43. A system according to claim 41, wherein said means for providing signal samples comprises means for providing signal samples of the received signal so as to provide a plurality of signal sample data sets which are consecutive and separated in time by one sample period.

44. A system according to claim 43, wherein the plurality of signal sample data sets comprises three signal sample data sets.

45. A system according to claim 44, wherein the weights are determined by the following equations:

$$w0 = \frac{0.5 - \tau(m)}{1.5}$$

$$w1 = \frac{1.5 - |\tau(m)|}{1.5}$$

$$w2 = \frac{0.5 + \tau(m)}{1.5}$$

where w0 corresponds to the earliest in time signal sample data set, w1 corresponds to the next consecutive signal sample data set and w2 corresponds to the latest in time signal sample data set.

46. A system for decoding codewords from a signal received by a device, comprising:
    means providing signal samples of the received signal so as to provide a plurality of signal sample data sets;
    means for determining correlations between a plurality of potential codewords and the plurality of signal sample data sets;
    means for combining correlations to provide a plurality of combined values;
    means for selecting a potential codeword corresponding to a high combined value as the decoded codeword;
    wherein said means for combining the correlations further comprises:
        means for weighting the correlation values;
        means for summing the weighted correlation values for each signal sample data set corresponding to a potential codeword for each potential codeword;
        wherein the means for weighting the correlation values comprises:
            means for determining a centroid from correlation values for each potential codeword;
            means for determining a sampling time offset for each codeword from the corresponding centroid; and
            means for determining weighting factors for each potential codeword from the sampling time offset and a pulse shape.

47. A system according to claim 46, wherein said means for combining correlations further comprises:
    means for determining the square root of the weighting factors;
    means for weighting the correlation values for each signal sample data set; and
    wherein said means for summing comprises:
        means for summing the weighted correlation values for each signal sample data set corresponding to a potential codeword for each potential codeword; and
        means for computing a squared magnitude of summed weighted correlations for each potential codeword.

48. A system according to claim 47, wherein said means for selecting a potential codeword comprises means for selecting the potential codeword with the highest squared magnitude of summed weighted correlation values.

49. A system according to claim 48, wherein the codeword is an orthogonal codeword.

50. A system according to claim 48, wherein said means for providing a plurality of signal samples comprises means for providing a plurality of signal samples so as to provide a plurality of signal sample data sets which are consecutive and separated in time by one sample period.

51. A system according to claim 50, wherein the plurality of signal sample data sets comprises three signal sample data sets.

52. A system according to claim 51, wherein the weights are determined by the following equations:

$$w0 = \frac{0.5 - \tau(m)}{1.5}$$

$$w1 = \frac{1.5 - |\tau(m)|}{1.5}$$

$$w2 = \frac{0.5 + \tau(m)}{1.5}$$

where w0 corresponds to the earliest in time signal sample data set, w1 corresponds to the next consecutive signal sample data set and w2 corresponds to the latest in time signal sample data set.

53. A radiotelephone comprising:
    a transmitter circuit;
    a user interface circuit;
    an antenna system;
    a receiver circuit having a orthogonal codeword decoder wherein the orthogonal codeword decoder of the receiver of the radiotelephone comprises:
        means for providing signal samples of the received signal so as to provide a plurality of signal sample data sets that are separated in time by at least one sample period and have a fixed timing relationship to one another;
        means for determining correlations between a plurality of potential codewords and the plurality of signal sample data sets;
        means for combining the correlations; and
        means for selecting a potential codeword with using the combined correlations as the decoded codeword.

* * * * *

UNITED STATES PATENT AND TRADEMARK OFFICE
CERTIFICATE OF CORRECTION

PATENT NO.    : 6,456,646 B1
DATED         : September 24, 2002
INVENTOR(S)   : Asokan et al.

It is certified that error appears in the above-identified patent and that said Letters Patent is hereby corrected as shown below:

Column 8,
Line 41, the formula should appear as follows:

--

$$P(m,k) = |R_{YH}(m,k)|^2, \quad m = 0.to.127, \quad k = 0,1,2$$

$$\overline{P}(m) = \sum_{k=0}^{2} P(m,k), \quad m = 0.to.127$$

--

Column 17,
Line 51, should read :
-- of signal sample data sets comprises three codeword data sets --

Signed and Sealed this

Twentieth Day of May, 2003

JAMES E. ROGAN
*Director of the United States Patent and Trademark Office*